(12) United States Patent
Ito et al.

(10) Patent No.: US 6,779,881 B2
(45) Date of Patent: Aug. 24, 2004

(54) INK, INK SET, AND INK JET RECORDING METHOD

(75) Inventors: Jun Ito, Nagano (JP); Miharu Kanaya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/241,800

(22) Filed: Sep. 11, 2002

(65) Prior Publication Data

US 2003/0095169 A1 May 22, 2003

(30) Foreign Application Priority Data

Sep. 13, 2001 (JP) ........................................ 2001-278784
Feb. 22, 2002 (JP) ........................................ 2002-046990

(51) Int. Cl.[7] .................................................. B41J 2/01
(52) U.S. Cl. ...................... 347/100; 347/95; 106/31.13; 106/31.27
(58) Field of Search ................................ 347/100, 101, 347/96, 95; 106/31.13, 31.27, 31.6

(56) References Cited

U.S. PATENT DOCUMENTS 6,511,169 B1 * 1/2003 Gallo et al. .................. 347/100

FOREIGN PATENT DOCUMENTS

| EP | 1048705 A1 * | 11/2000 | ........... C09D/11/00 |
|----|-----|-----|-----|
| JP | 05214259 | 8/1993 | |
| JP | 06228447 | 8/1994 | |
| JP | 08073791 | 3/1996 | |
| JP | 08090211 | 4/1996 | |
| JP | 10306221 | 11/1998 | |
| JP | 2001115072 | 4/2001 | |
| WO | WO 02/070609 A1 * | 9/2002 | ........... C09B/43/16 |

OTHER PUBLICATIONS

Patent Abstracts of Japan and Japanese Patent Office English Computer Translation of JP 05214259 dated Aug. 24, 1993.
Patent Abstracts of Japan and Japanese Patent Office English Computer Translation of JP 06228447 dated Aug. 16, 1994.
Patent Abstracts of Japan and Japanese Patent Office English Computer Translation of JP 2001115072 dated Apr. 24, 2001.
Patent Abstracts of Japan and Japanese Patent Office English Computer Translation of JP 10306221 dated Nov. 17, 1998.
Patent Abstracts of Japan and Japanese Patent Office English Computer Translation of JP 08073791 dated Mar. 19, 1996.
Patent Abstracts of Japan and Japanese Patent Office English Computer Translation of JP 08090211 dated Apr. 9, 1996.

* cited by examiner

Primary Examiner—Stephen D. Meier
Assistant Examiner—Manish Shah
(74) Attorney, Agent, or Firm—Ladas & Parry

(57) ABSTRACT

The present invention provides an ink, an ink set, and a recording method with which the light fastness is good and good characteristics such as color, fire resistance, moisture resistance, clogging resistance, and storage stability can be achieved, which is accomplished by using a magenta ink including at least a first dye and a second dye, the first dye having a structure expressed by the General Formula I, the second dye being one or more types of dye selected from among dyes having a structure expressed by the following General Formula II and/or C.I. Acid Violet 9 and 30 and C.I. Acid Red 50, 52, and 289, and the weight ratio of first dye to second dye being 5:1 to 1:5.

23 Claims, No Drawings

INK, INK SET, AND INK JET RECORDING METHOD

TECHNICAL FIELD

This invention relates to an ink, an ink set, and an ink jet recording method that are particularly favorable for ink jet recording.

BACKGROUND ART

As is commonly known, ink jet recording is a method in which printing is performed by causing droplets of ink to fly out and adhere to a recording medium such as paper. This printing method allows images of high resolution and quality to be printed quickly and simply with an inexpensive apparatus, and particularly in the field of color printing, this image formation method has in recent years been the subject of technological development as an alternative to photography.

When a color image is formed by ink jet recording, the printing is performed using inks of at least the three primary colors of magenta, yellow, and cyan, but more recently it has become commonplace to obtain a more detailed image by using light and dark inks of different density for the magenta ink and cyan ink in order to obtain a higher-quality image. It is important that these inks themselves have excellent color reproducibility, and achieving good color reproducibility is also important when two or more inks selected from among magenta ink, yellow ink, and cyan ink are printed on top of each other and red, green, blue, and black are formed.

In the past these ink-jet inks have mainly consisted of water-based inks, in consideration of odor and safety (e.g., fire hazards). Among the properties required of these inks are that their viscosity, surface tension, and other such physical properties be within a suitable range, that they have excellent storage stability and do not clog the nozzle, that they give a high-density recorded image, and that they have excellent light fastness, water resistance, and moisture resistance.

Most of these performance requirements can be satisfied by using a water-based ink in which the main solvent is water or a mixture of water and a water-soluble organic solvent, but color, clarity, light fastness, water resistance, moisture resistance, and so forth are greatly affected by the colorant, and many different dyes have been researched up to now.

In particular, with a color recording method that makes use of inks of a number of colors, all of the inks used must have uniform characteristics. Fading and color changes caused by light (sunlight, fluorescent light, etc.) is particularly pronounced with magenta dyes, more so than with other dyes (cyan and yellow dyes). Therefore, the inferior light fastness of a magenta ink compared to that of other inks means that not only will this inferiority be apparent with the magenta ink by itself, but also in secondary colors (such as red and blue) expressed by superposing yellow ink or cyan ink, and this leads to a change in the color of the overall image in recorded material, and a loss of quality.

Acid dyes that are highly water soluble and have good color development, such as C.I. Acid Red 52, 249, and 289, have been known in the past as magenta dyes for use in ink jet recording, but although nozzle clogging tended not to occur when these dyes were used alone because of their high water solubility, their light fastness performance was extremely poor.

In response to these requirements, Japanese Laid-Open Patent Applications H6-228447, H8-90211, H8-73791, H10-306221 and so forth have disclosed a magenta dye ink with excellent light fastness, water resistance, moisture resistance, color, clarity, and so on.

Still, light fastness, water resistance, vivid color and color reproducibility, nozzle clogging resistance, and so forth could not all be satisfied at the same time with inks in which these magenta dyes proposed in the past were used.

It has also been disclosed, in Japanese Laid-Open Patent Applications H5-214259 and 2001-115072, that excellent color reproducibility and light fastness can be obtained even with secondary or tertiary colors by using an ink set that makes use of a specific dye set.

However, light fastness, water resistance, vivid color and color reproducibility, nozzle clogging resistance, and so forth could not all be satisfied at the same time with inks in which these ink sets proposed in the past were used.

It is therefore an object of the present invention to provide an ink, an ink set, and a recording method with which light fastness, water resistance, vivid color and color reproducibility, nozzle clogging resistance, and so forth can all be satisfied.

DISCLOSURE OF THE INVENTION

The stated object is achieved with the present invention as follows.

The magenta ink of the present invention comprises at least water, a water-soluble organic solvent, a first dye, and a second dye, the first dye has a structure expressed by the following General Formula I, the second dye is a dye having a structure expressed by the following General Formula II and/or one or more types of dye selected from among C.I. Acid Violet 9 and 30 and C.I. Acid Red 50, 52, and 289, and the weight ratio of first dye to second dye is 5:1 to 1:5.

General Formula 1:

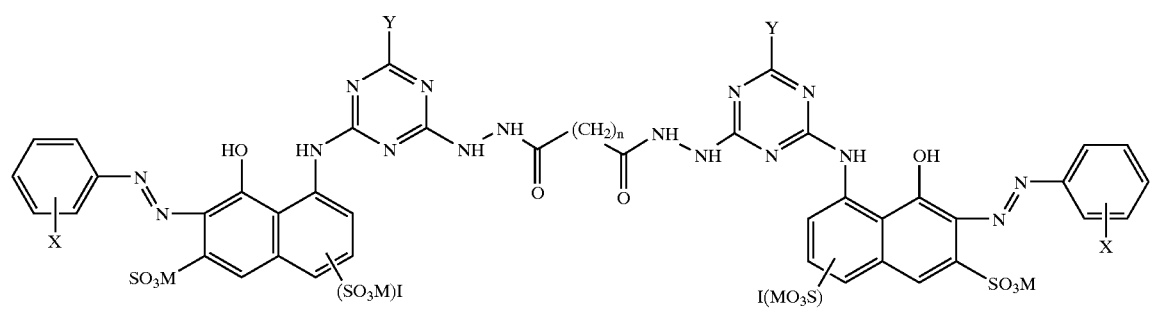

X: —COOM or SO₃M
Y: —H, —NH₂, —O(CH₂)mH₁
M: —H, —Li, —Na, —K, —NH₄, —NH(CH₂OH)
n = 2 to 10
m = 1 to 4
i = 0 or 1

General Formula II:

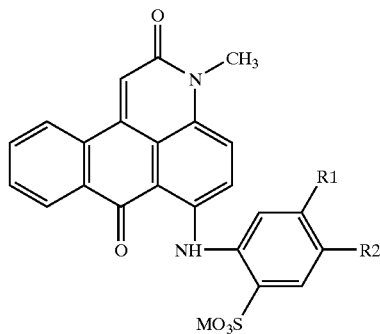

M is H, Li, Na, K, ammonium, or an organic amine
R1 is H, Cl, or

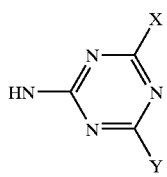

X is an anilino group substituted with at least one SO₃M
Y is OH, Cl, or a morpholino group
R2 is H, CH₃, Cl, or SO₃M The dyes in the ink of the present invention may be water-soluble dyes.

It is preferable for the total amount of dye contained in the ink to be 0.5 to 5 wt % of the total ink weight.

The ink of the present invention may contain a glycol ether of a lower alkyl and/or an acetylene glycol-based nonionic surfactant.

The ink of the present invention may be such that the above-mentioned glycol ether of a lower alkyl includes at least one type of compound selected from the group consisting of diethylene glycol monobutyl ether, triethylene glycol monobutyl ether, propylene glycol monobutyl ether, and dipropylene glycol monobutyl ether.

The ink of the present invention may contain the glycol ether of a lower alkyl in an amount of 3 to 30 wt % of the total ink weight.

The ink of the present invention may contain the acetylene glycol-based nonionic surfactant in an amount of 0.1 to 3 wt % of the total ink weight.

The ink set of the present invention is an ink set composed of at least a dye, a water-soluble organic solvent, and water, wherein said ink set is composed of the magenta ink according to claim 1, a yellow ink containing a dye containing C.I. Direct Yellow 86 and C.I. Direct Yellow 132 in a weight ratio of from 1:3 to 3:1, or a dye containing C.I. Direct Yellow 86 and C.I. Direct Yellow 173 in a weight ratio of from 1:4 to 4:1, and a cyan ink containing C.I. Direct Blue 86 and/or C.I. Direct Blue 199.

In the ink set of the present invention, the respective dyes of the magenta ink, yellow ink, and cyan ink may be water-soluble dyes.

In the ink set of the present invention, it is preferable for the total amount of dye contained in the magenta ink to be 1 to 4 wt % of the total ink weight, the total amount of dye contained in the yellow ink to be 0.5 to 4 wt % of the total ink weight, and the total amount of dye contained in the cyan ink to be 1 to 4 wt % of the total ink weight.

The ink set of the present invention may contain a glycol ether of a lower alkyl and/or an acetylene glycol-based nonionic surfactant.

The ink set of the present invention may be such that the above-mentioned glycol ether of a lower alkyl includes at least one type of compound selected from the group consisting of diethylene glycol monobutyl ether, triethylene glycol monobutyl ether, propylene glycol monobutyl ether, and dipropylene glycol monobutyl ether.

The ink set of the present invention may contain the glycol ether of a lower alkyl in an amount of 3 to 30 wt % of the total ink weight.

The ink set of the present invention may contain the acetylene glycol-based nonionic surfactant in an amount of 0.1 to 3 wt % of the total ink weight.

The recording method of the present invention is an ink jet recording method in which printing is performed by discharging droplets of ink and causing them to adhere to a recording medium, wherein the above-mentioned ink is used as the ink.

Also, the recording method of the present invention is an ink jet recording method in which at least a magenta ink, a yellow ink, and a cyan ink are used to form a color image, wherein the ink set is used.

BEST MODE FOR CARRYING OUT THE INVENTION

When ink jet recording is performed using the ink or ink set pertaining to the present invention, the resulting image will have good light fastness, as well as excellent color, water resistance, moisture resistance, color reproducibility, and other characteristics. Preferred embodiments of the present invention will now be given to describe the present invention in further detail.

The magenta ink used in the present invention includes a first dye, which is a dye having the structure expressed by General Formula I, and a second dye, which is a dye having the structure expressed by General Formula II and/or one or more types of dye selected from among C.I. Acid Violet 9 and 30 and C.I. Acid Red 50, 52, and 289.

For the sake of safety and other such considerations, the dye having the structure expressed by General Formula I used in the present invention, and the dye having the structure expressed by General Formula II, and the C.I. Acid Violet 9 and 30 and C.I. Acid Red 50, 52, and 289 are preferably water-soluble dyes that will dissolved in a water-soluble ink.

Specific examples of the dye expressed by General Formula I are given below, but this list is not intended to be comprehensive.

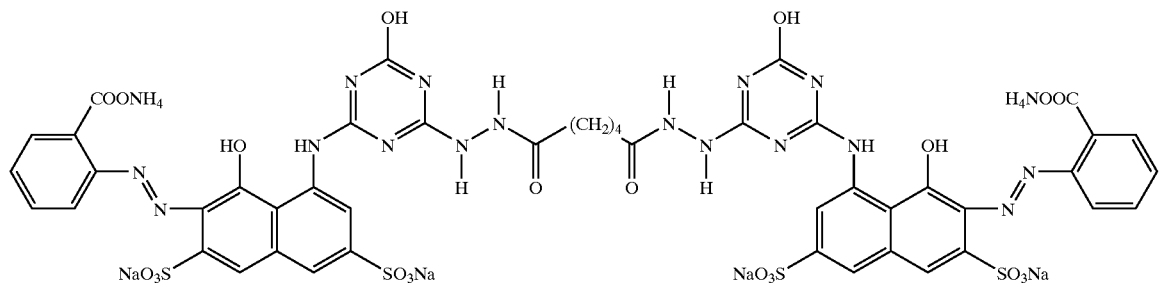
(M-1)
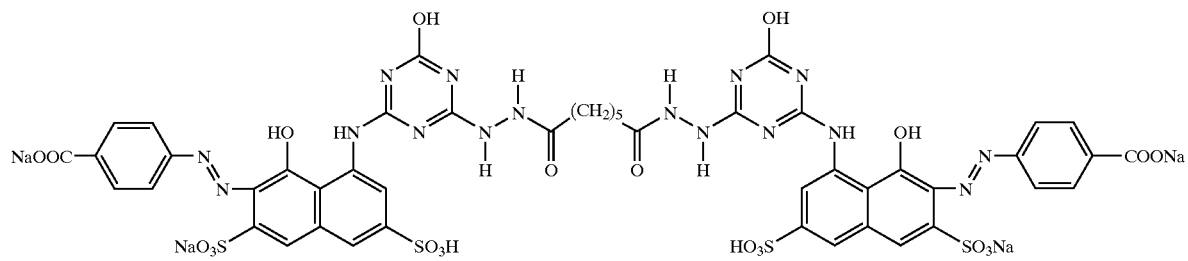
(M-2)
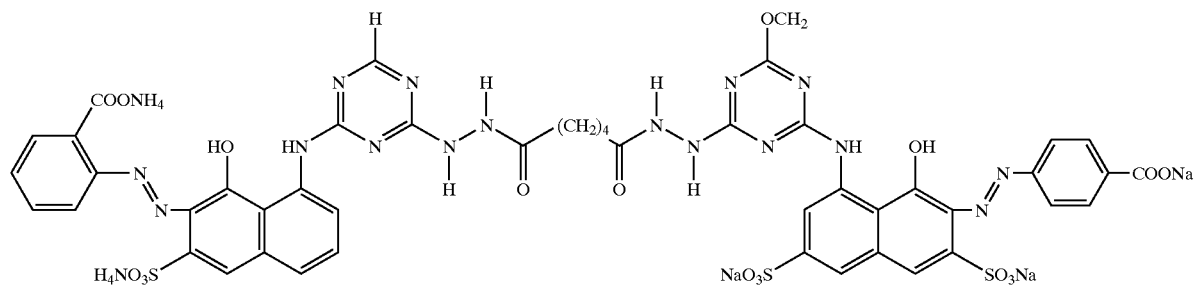
(M-3)
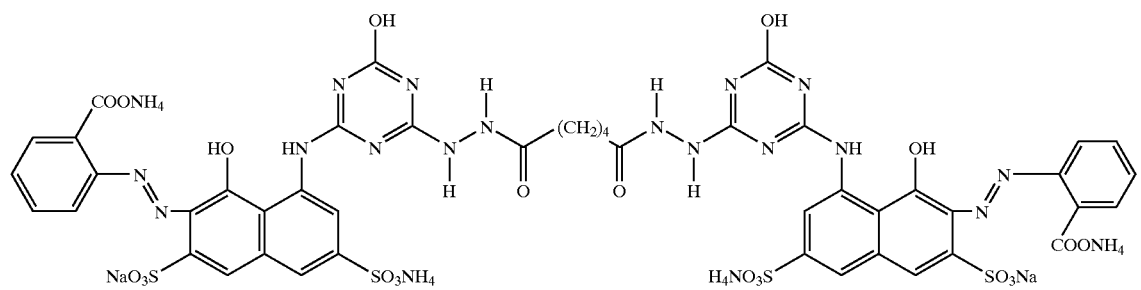
(M-4)
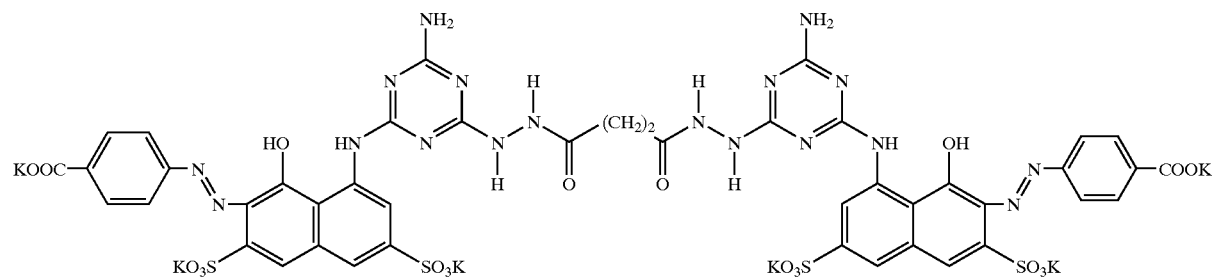
(M-5)

-continued
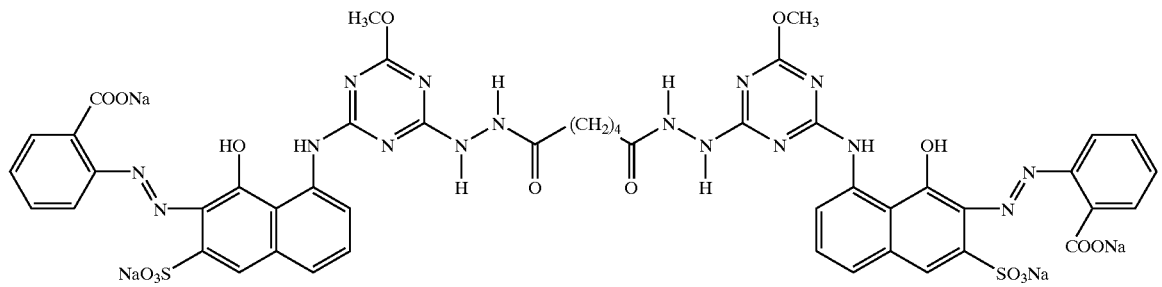
(M-6)
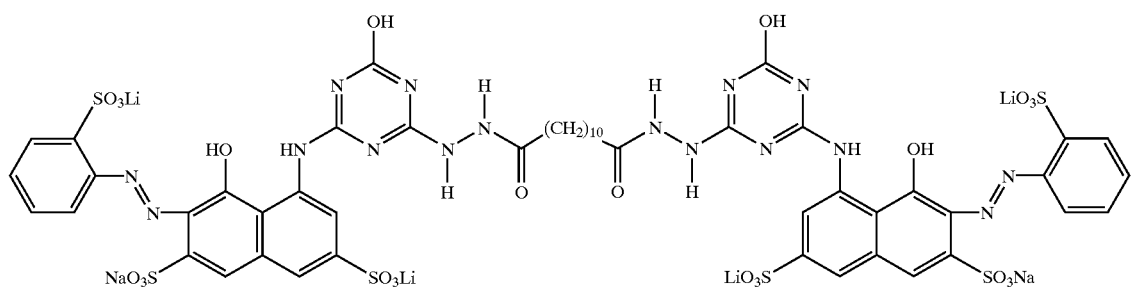
(M-7)
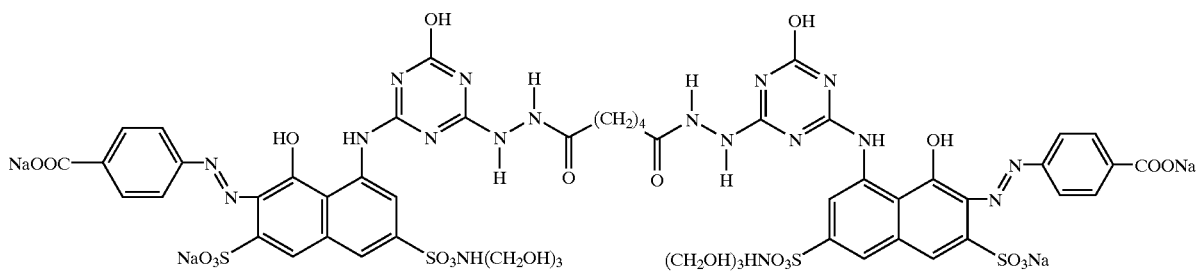
(M-8)
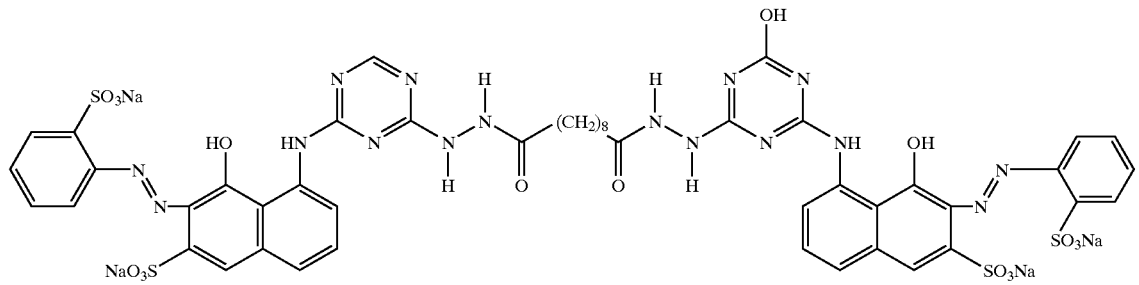
(M-9)
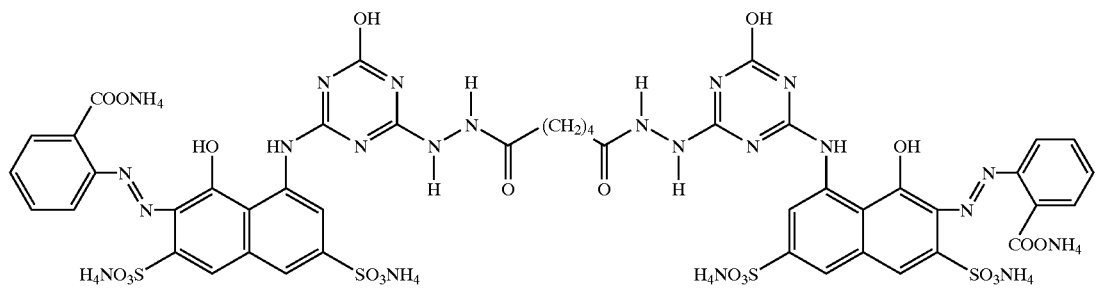
(M-10)

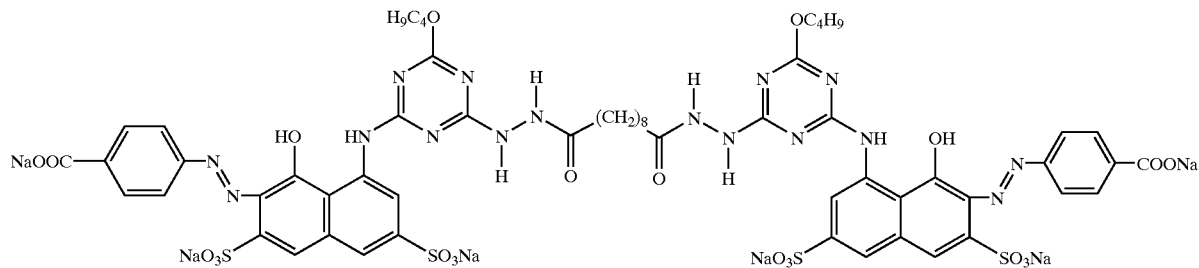
(M-11)
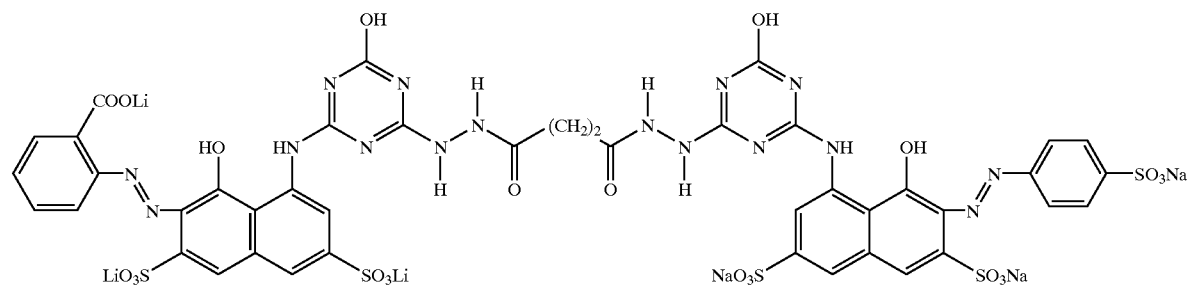
(M-12)
Specific examples of the dye expressed by General Formula II are given below, but this list is not intended to be comprehensive, either.
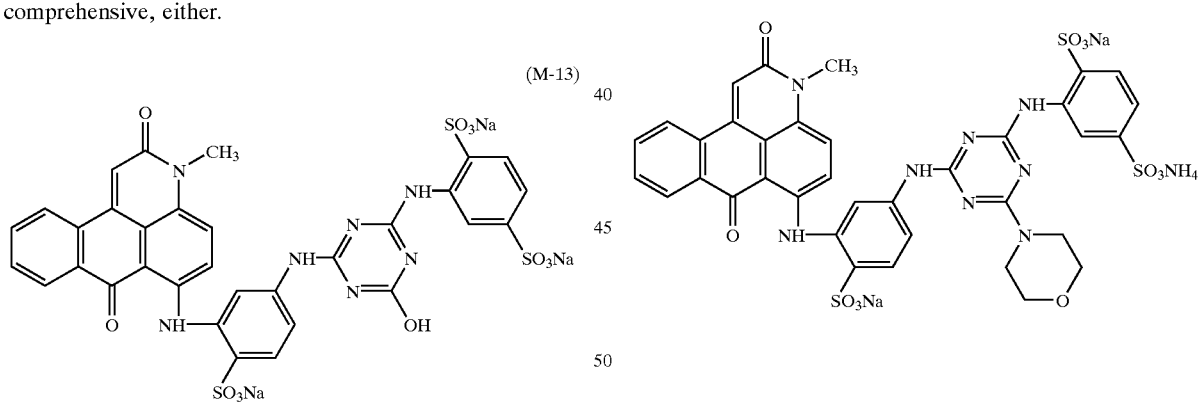
(M-13)
(M-14)
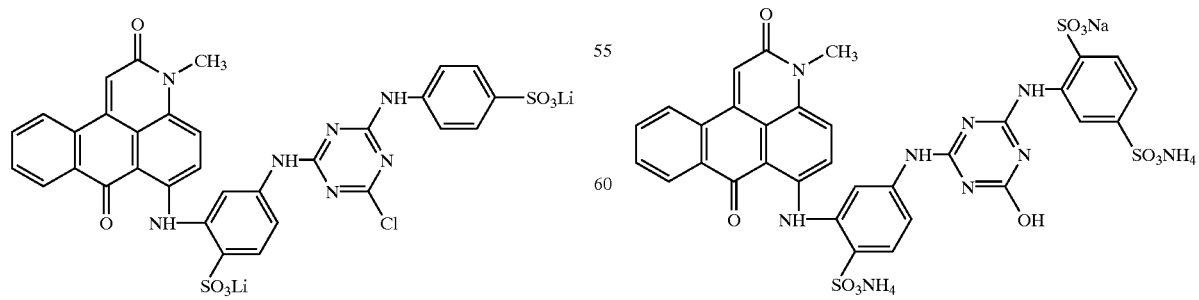
(M-15)
(M-16)

(M-17)
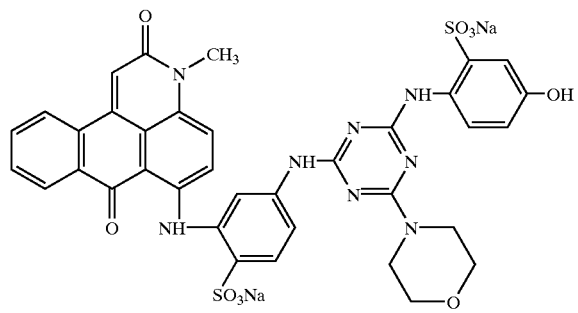
(M-18)
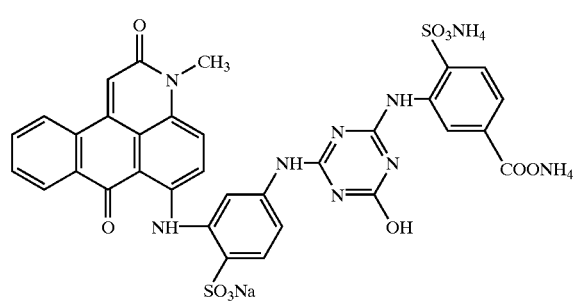
(M-19)
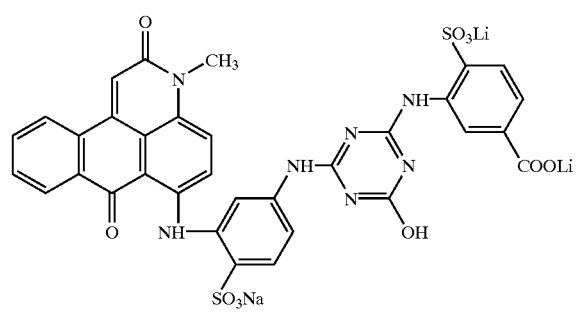
(M-20)
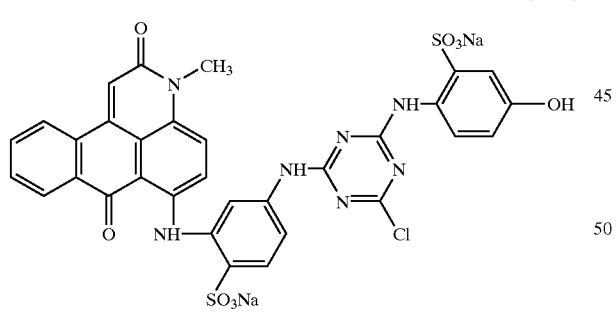
(M-21)
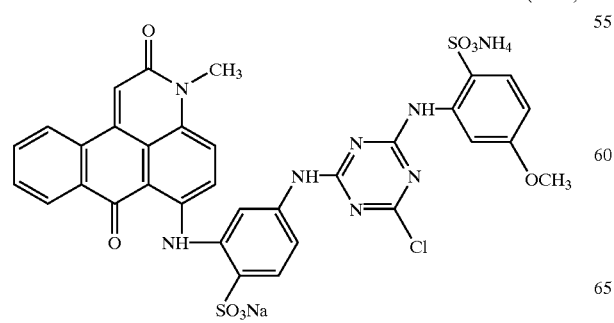
(M-22)
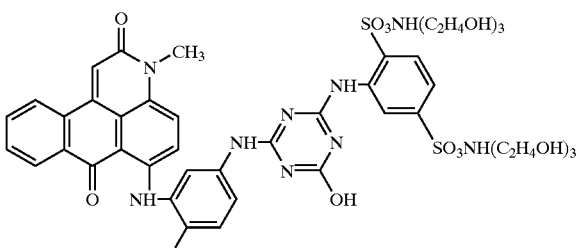
(M-23)
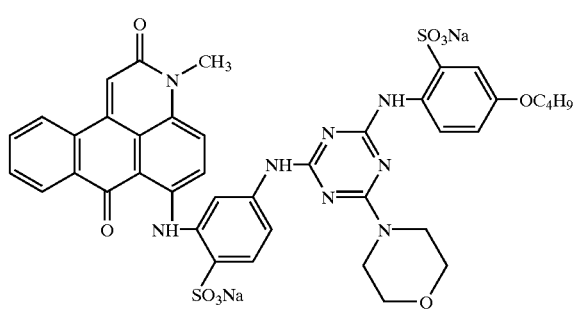
(M-24)
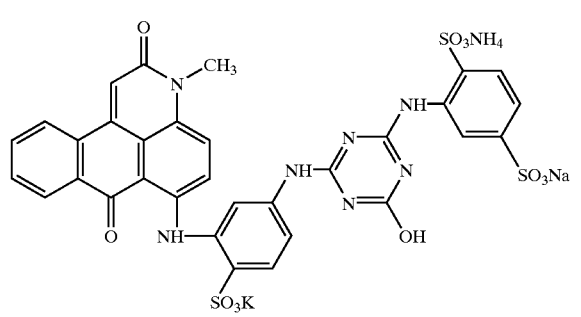
(M-25)
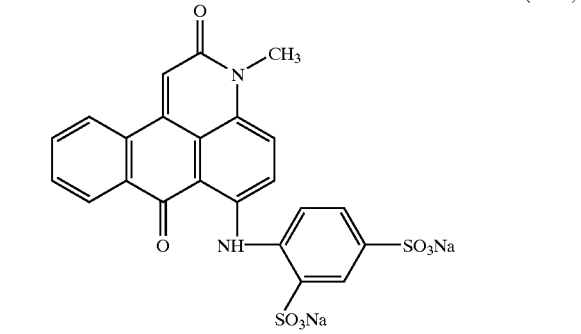
(M-26)
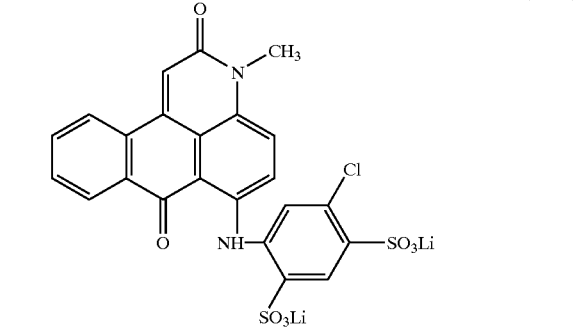

-continued

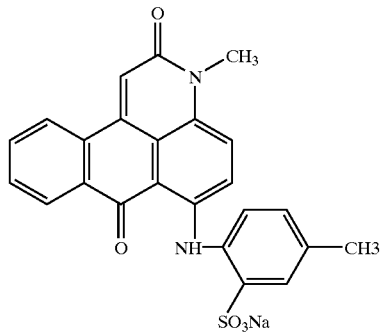

(M-27)

Examples of dyes that can be used as the second dye, either alone or as a mixture with a dye having the structure expressed by General Formula II, include xanthene dyes selected from among C.I. Acid Violet 9 and 30 and C.I. Acid Red 50, 52, and 289.

Adequate light fastness will not be obtained when these xanthene dyes are used alone, but excellent light fastness can be obtained by mixing with a dye having the structure expressed by General Formula I, and the color development of a magenta ink will also be improved.

As to the amount in which the dyes are added, it is preferable for the dye having the structure expressed by General Formula I (the first dye) and the dye having the structure expressed by General Formula II and/or one or more types of dye selected from among C.I. Acid Violet 9 and 30 and C.I. Acid Red 50, 52, and 289 (the second dye) to be used in a weight ratio of first dye:second dye=5:1 to 1:5, (more preferably, a weight ratio of first dye:second dye=3:1 to 1:1) and for the amount to be from 0.5 to 5 wt % of the total ink weight (and more preferably, 1 to 4 wt % of the total ink weight). Specifically, keeping the amount within this range ensures the reliability of the ink-jet ink, such as its printing density and clarity, clogging resistance, and discharge stability. Furthermore, an ink with excellent solubility in water, and excellent clarity and light fastness can be provided.

The yellow ink that can be used in the ink set pertaining to the present invention in combination with the above-mentioned magenta ink preferably contains a dye including C.I. Direct Yellow 86 and C.I. Direct Yellow 132 in a weight ratio of 1:3 to 3:1, or a dye including C.I. Direct Yellow 86 and C.I. Direct Yellow 173 in a weight ratio of 1:4 to 4:1, in an amount of 0.5 to 4 wt % of the total ink weight. Keeping the amount within this range ensures the reliability of the ink-jet ink, such as its printing density and clarity, clogging resistance, and discharge stability. Furthermore, an ink with excellent solubility in water, and excellent clarity and light fastness can be provided.

The cyan ink that can be used in the ink set pertaining to the present invention in combination with the above-mentioned magenta ink preferably contains C.I. Direct Blue 86 and/or C.I. Direct Blue 199 in an amount of 1 to 4 wt % of the total ink weight. Keeping the amount within this range ensures the reliability of the ink-jet ink, such as its printing density and clarity, clogging resistance, and discharge stability. Furthermore, an ink with excellent solubility in water, and excellent clarity and light fastness can be provided.

The liquid medium in which the above-mentioned specific dyes of the magenta ink, yellow ink, and cyan ink are dissolved is preferably a mixture of water and a water-soluble organic solvent. The water here is preferably deionized water, rather than ordinary water which contains various ions, and the water-soluble organic solvent is preferably a solvent with low volatility from the standpoint of minimizing clogging. Examples include ethylene glycol, diethylene glycol, triethylene glycol, polyethylene glycol, propylene glycol, 1,3-propanediol, 1,5-pentanediol, 1,2-hexanediol, 1,2,6-hexanetriol, glycerol, and other such polyhydric alcohols; ethylene glycol monomethyl ether, ethylene glycol monobutyl ether, diethylene glycol monomethyl ether, diethylene glycol monobutyl ether, triethylene glycol monomethyl ether, triethylene glycol monobutyl ether, propylene glycol monomethyl ether, propylene glycol monobutyl ether, dipropylene glycol monomethyl ether, and other such glycol ethers; formamide, dimethylformamide, diethanolamine, triethanolamine, 1,3-dimethyl-2-imidazolidinone, 2-pyrrolidone, N-methyl-2-pyrrolidone, and other such nitrogen-containing solvents; and thiodiglycol, dimethyl sulfoxide, and other such sulfur-containing solvents. The present invention is not limited to these compounds, however, and a plurality of types of water-soluble organic solvent may also be contained. As to the content thereof, a range of 3 to 50 wt % with respect to the total ink weight is suitable for an ink-jet ink. Keeping the content to at least 3 wt % prevents the nozzle tip from clogging, while keeping it to no more than 50 wt % prevents a decrease in the dryability of the recorded image or the bleeding of the recorded image, which would lead to a drop in print quality.

Adding glycol ether of a lower alkyl is effective with respect to the dryability and bleeding of the ink. Particularly suitable examples include diethylene glycol monobutyl ether, triethylene glycol monobutyl ether, propylene glycol monobutyl ether, and dipropylene glycol monobutyl ether, and the added amount thereof is preferably selected from a range of 3 to 30 wt %. Keeping the amount to at least 3 wt % is effective with respect to dryability and bleeding, while keeping it to no more than 30 wt % prevents excessive bleeding and maintains print quality, so it is preferable for the amount to be within the above range.

An acetylene glycol-based nonionic surfactant is also effective with respect to the dryability and bleeding of the ink. Specific examples include Olfin E1010, Olfin STG, and Surfinol 104E (the above are products of Nisshin Chemical). The added amount thereof is preferable between 0.1 and 3 wt % with respect to the total ink weight.

Even more preferably, a sharp image with no bleeding can be obtained by using the above-mentioned acetylene glycol-based nonionic surfactant together with glycol ether.

The water content here is determined over a wide range by the type of the above-mentioned solvent component, the composition thereof, and the desired characteristics of the recording liquid, but is generally within a range of 10 to 70 wt % of the total ink weight.

In addition to the above-mentioned components, in order to impart the desired performance to the ink of the present invention, the ink may contain as necessary sodium alginate, polyvinyl alcohol, or another viscosity regulator, or sodium hydroxide, potassium hydroxide, lithium hydroxide, or another hydroxide of an alkali metal, or ammonium phosphate, or another such pH buffer or other pH regulator, or a preservative, rustproofing agent, antioxidant, mildew inhibitor, fungicide, chelating agent, or other such additive.

With the ink jet recording method pertaining to the present invention, it is possible to obtain excellent color reproducibility in magenta, yellow, and cyan, as well as good light fastness in primary, secondary, and tertiary colors.

Also, the ink jet recording method of the present invention involves using the above-mentioned ink to perform recording, and can make use of any conventional type of head discharge system, but a particularly outstanding ink jet recording method can be realized with methods in which the vibration of a piezoelectric element is utilized to discharge droplets, or methods in which thermal energy is utilized.

EXAMPLES

The present invention will now be described in more specific terms by giving examples.

Examples 1 to 6 and Comparative Examples 1 to 4

The inks of the examples and comparative examples were mixed and dissolved in the proportions given in Table 1, filtered under pressure through a membrane filter with a pore diameter of 1 $\mu$m, and deaerated using a vacuum pump to prepare the inks of the examples and comparative examples. The ink components given in the table are given as the weight percentage of each component versus the total ink weight, with the balance being water. The dye of the present invention was used in Examples 1 to 6, while in Comparative Examples 1 to 4 C.I. Direct Red 227, C.I. Acid Red 52, and C.I. Acid Red 249 were used, either alone or as a mixture with the dye of the present invention, as a conventional magenta dye instead of the dye of the present invention, and each product was evaluated.

TABLE 1

| | Ex. 1 | Ex. 2 | Ex. 3 | Ex. 4 | Ex. 5 | Ex. 6 | C.E. 1 | C.E. 2 | C.E. 3 | C.E. 4 |
|---|---|---|---|---|---|---|---|---|---|---|
| M-1 | 1 | | | | | | | | | |
| M-3 | | 2.5 | | | | | | | | 2.5 |
| M-5 | | | 1 | | | 2 | | | | |
| M-7 | | | | 1.2 | | | | | | |
| M-11 | | | | | 1.5 | | | | | |
| M-16 | 1 | | | | | | | | | |
| M-18 | | 1.5 | | | | | | | | |
| M-20 | | | 3.8 | | | 1 | | | | |
| M-24 | | | | | | | | | | |
| M-27 | | | | 2.8 | | | | | | |
| C.I. Acid Red 289 | | | | | 0.5 | | | | | |
| C.I. Acid Violet 30 | | | | | 0.3 | | | | | |
| C.I. Direct Red 227 | | | | | | | 2.5 | | | |
| C.I. Acid Red 52 | | | | | | 0.5 | | 2 | 1.5 | 0.5 |
| C.I. Acid Red 249 | | | | | | | | | 1.5 | 1 |
| TEGmBE | 10 | 10 | | | | 10 | 10 | | | |
| DEGmBE | | | 10 | | | | | 10 | | 10 |
| DPGmBE | | | | 10 | | | | | 10 | |
| TEG | 8 | | | 8 | | | | 8 | | 10 |
| DEG | | 8 | 10 | | 8 | 8 | 10 | | 10 | |
| GL | 10 | 10 | 10 | 10 | 10 | 10 | 10 | 10 | 10 | 10 |
| Olfin E1010 | 0.8 | 1 | | 1.2 | | 1 | 0.8 | | | |
| Olfin STG | | | 1 | | 0.5 | | | 1 | 1 | |
| TEA | 0.5 | 0.5 | 1 | | 1 | 1 | 1 | 0.5 | 1 | 1 |
| EDTA | 0.01 | 0.01 | 0.01 | 0.01 | 0.01 | 0.01 | 0.01 | 0.01 | 0.01 | 0.01 |
| Proxel XL-2 | 0.3 | 0.3 | 0.3 | 0.3 | 0.3 | 0.3 | 0.3 | 0.3 | 0.3 | 0.3 |

Key to Table 1:
TEGmBE: triethylene glycol monobutyl ether
DEGmBE: diethylene glycol monobutyl ether
DPGmBE: dipropylene glycol monobutyl ether
TEG: triethylene glycol
DEG: diethylene glycol
GL: glycerol
TEA: triethanolamine
KOH: potassium hydroxide
EDTA: sodium dihydrogen ethylenediaminetetraacetate; chelating agent
Olfin E1010 and Olfin STG are trade names of Nisshin Chemical; acetylene glycol-based surfactants
Proxel XL-2 is a trade name of Avecia K.K.; preservative A printing test was performed using the inks obtained in the above Examples 1 to 6 and Comparative Examples 1 to 4 and using an EM-930C ink jet printer (made by Seiko-Epson). Four different types of recording medium were printed: PM mat paper (special ink jet printer paper), photoprint paper 2, PM photographic paper (made by Seiko-Epson), and Xerox 4024 ordinary paper (made by Xerox Co.), and the samples thus obtained were evaluated in the following tests 1 to 5.

Test 1: Light Fastness

Each of the inks from the examples and comparative examples was solid-printed, a light fastness test was conducted for 60 hours using a xenon weatherometer Ci5000 (made by Atlas Electric Devices), and measurements were made with a Gretag densitometer (made by Gretag). The color difference ΔE*ab before and after the test was found from the following equation (i), and an evaluation was made from these results on the basis of the following criteria.

$$\Delta E^*ab = [(\Delta L^*)^2 + (\Delta a^*)^2 + (\Delta b^*)^2]^{1/2} \quad (i)$$

Evaluation Criteria

A: color difference ΔE*ab of 5 or less

B: color difference ΔE*ab of greater than 5, but not over 10

C: color difference ΔE*ab of greater than 10, but not over 20

D: color difference ΔE*ab of greater than 20

Test 2: Water Resistance

Each of the inks from the examples and comparative examples was solid-printed on the above-mentioned recording medium and dried, after which pure water was dropped onto the printed product, and five minutes later the printed product was checked to see if the water drop had left a mark. An evaluation was made from these results on the basis of the following criteria.

Evaluation Criteria

A: water drop left no mark whatsoever

B: water drop left almost no mark

C: water drop left some mark

D: water drop left a considerable mark

Test 3: Moisture Resistance

Each of the inks from the examples and comparative examples was outline-printed on the above-mentioned recording medium and dried, after which the product was left for one day in an environment of 40° C. and 85% RH. An evaluation of the bleeding of the ink was then made on the basis of the following criteria.

Evaluation Criteria

A: almost no bleeding into white area

B: some bleeding into white area

C: considerable bleeding into white area

Test 4: Ink Storage Stability

Each of the inks from the examples and comparative examples was sealed in a glass sample bottle and left at 70° C. for 6 days. Each sample was then checked to see if the ink had precipitated and dropped onto a 10 μm metal filter. The physical properties were evaluated, and a grade was assigned from these results on the basis of the following criteria.

Evaluation Criteria

A: no precipitation, no change in ink properties or color

B: no precipitation, but slight change in ink properties or color

C: precipitation and change in ink properties or color

Test 5: Nozzle Clogging Recoverability

A head was repeatedly cleaned and filled with each of the inks from the examples and comparative examples, each nozzle was checked by test printing to see if the ink was being discharged, and the nozzles were left uncapped for one month at 40° C. The power was then turned on to the printer, and an evaluation was made on the basis of the following criteria from the number of cleanings required for all nozzles to be capable of discharge.

Evaluation Criteria

A: one cleaning

B: two to four cleanings

C: five or more cleanings

D: no recovery

The above test results are given in Table 2.

TABLE 2

|  | Ex. 1 | Ex. 2 | Ex. 3 | Ex. 4 | Ex. 5 | Ex. 6 | C.E. 1 | C.E. 2 | C.E. 3 | C.E. 4 |
|---|---|---|---|---|---|---|---|---|---|---|
| Test 1 | | | | | | | | | | |
| Xerox 4024 | B | B | B | B | B | B | D | D | D | C |
| PM mat | A | A | A | A | A | A | D | D | D | B |
| Photoprint paper | B | A | B | A | B | B | D | D | D | B |
| PM photographic paper | A | A | A | A | A | A | D | D | D | B |
| Test 2 | | | | | | | | | | |
| Xerox 4024 | B | C | B | B | C | B | D | D | D | D |
| PM mat | B | C | B | B | B | B | D | D | D | C |
| Photoprint paper | B | B | B | B | B | B | D | D | D | C |
| PM photographic paper | A | A | B | B | B | B | D | D | C | B |
| Test 3 | | | | | | | | | | |
| PM mat | A | A | A | A | A | A | C | C | C | B |
| Photoprint paper | A | A | A | A | A | A | C | C | C | B |
| PM photographic paper | A | A | A | A | A | A | C | C | C | B |
| Test 4 | A | A | A | A | A | A | A | A | A | A |
| Test 5 | A | B | B | B | B | B | B | B | B | B |

Examples 7 to 12 and Comparative Examples 5 to 8

The ink sets in the examples and comparative examples were mixed and dissolved in the proportions shown in Tables 3 and 4, filtered under pressure through a membrane filter with a pore diameter of 1 μm, and deaerated using a vacuum pump to prepare the ink sets of the examples and comparative examples. The ink components given in the tables are given as the weight percentage of each component versus the total ink weight, with the balance being water.

TABLE 3

|  | Example 7 | | | Example 8 | | | Example 9 | | | Example 10 | | | Example 11 | | | Example 12 | | |
| --- | --- | --- | --- | --- | --- | --- | --- | --- | --- | --- | --- | --- | --- | --- | --- | --- | --- | --- |
|  | M | Y | C | M | Y | C | M | Y | C | M | Y | C | M | Y | C | M | Y | C |
| M-1 | 1.5 | | | | | | | | | | | | | | | | | |
| M-3 | | | | 2.5 | | | | | | | | | | | | 2 | | |
| M-5 | | | | | | | 1 | | | | | | | | | | | |
| M-7 | | | | | | | | | | 1.2 | | | | | | | | |
| M-13 | | | | | | | | | | | | | 2 | | | | | |
| M-20 | | | | | | | | | | 2.8 | | | | | | | | |
| M-22 | 1.5 | | | | | | | | | | | | | | | | | |
| M-24 | | | | 1.5 | | | | | | | | | | | | | | |
| M-25 | | | | | | | 3.8 | | | | | | | | | | | |
| M-28 | | | | | | | | | | | | | | | | 1 | | |
| C.I. Acid Red 52 | | | | | | | | | | | | | 0.5 | | | 1 | | |
| C.I. Acid Violet 30 | | | | | | | | | | | | | 0.3 | | | | | |
| C.I. Direct Yellow 86 | | 2 | | | 0.5 | | | 0.5 | | | 2 | | | 0.5 | | | 0.5 | |
| C.I. Direct Yellow 132 | | 0.75 | | | | | | | | | 0.75 | | | | | | | |
| C.I. Direct Yellow 173 | | | | | 2 | | | 2 | | | | | | 2 | | | 2 | |
| C.I. Acid Yellow 32 | | | | | | | | | | | | | | | | | | |
| C.I. Direct Blue 86 | | | 4.0 | | | | | | | | | 4.0 | | | | | | |
| C.I. Direct Blue 199 | | | | | | 3.5 | | | 3 | | | | | | 3.5 | | | 2.5 |
| TEGmBE | 10 | 10 | 10 | | | | 12 | 12 | 12 | | | | 8 | 8 | 8 | | | |
| DEGmBE | | | | 12 | 12 | 12 | | | | 10 | 10 | 10 | | | | 10 | 10 | 10 |
| DPGmBE | | | | | | | | | | | | | | | | | | |
| TEG | | | | 10 | 10 | 10 | 10 | 10 | 10 | | | | 10 | 10 | 10 | 10 | 10 | 10 |
| DEG | 10 | 10 | 10 | | | | | | | 10 | 10 | 10 | | | | | | |
| GL | 10 | 10 | 10 | 10 | 10 | 10 | 10 | 10 | 10 | 10 | 10 | 10 | 12 | 12 | 12 | 10 | 10 | 10 |
| Olfin E1010 | 1.0 | 1.0 | 1.0 | | | | | | | 1.0 | 1.0 | 1.0 | | | | | | |
| Olfin STG | | | | | | | | | | | | | | | | | | |
| TEA | 1.0 | 1.0 | 1.0 | 0.5 | 0.5 | 0.5 | 0.5 | 0.5 | 0.5 | 1.0 | 1.0 | 1.0 | 0.5 | 0.5 | 0.5 | 0.5 | 0.5 | 0.5 |
| EDTA | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 |
| Proxel XL-2 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |

TABLE 4

|  | C.E. 5 | | | C.E. 6 | | | C.E. 7 | | | C.E. 8 | | |
| --- | --- | --- | --- | --- | --- | --- | --- | --- | --- | --- | --- | --- |
|  | M | Y | C | M | Y | C | M | Y | C | M | Y | C |
| M-3 | | | | | | | | | | 1 | | |
| M-25 | | | | | | | | | | | | |
| C.I. Direct Red 227 | 2.5 | | | | | | | | | | | |
| C.I. Acid Red 52 | | | | | | | 1.5 | | | 1 | | |
| C.I. Acid Red 249 | | | | 2 | | | 1.5 | | | 1 | | |
| C.I. Direct Yellow 86 | | 2 | | | 0.5 | | | 2 | | | 0.5 | |
| C.I. Direct Yellow 132 | | 0.75 | | | | | | 0.75 | | | | |
| C.I. Direct Yellow 173 | | | | | 2 | | | | | | 2 | |
| C.I. Acid Yellow 32 | | | | | | | | | | | | |
| C.I. Direct Blue 86 | | | | | | | | | 2.5 | | | |
| C.I. Direct Blue 199 | | | | | | 3.5 | | | | | | |
| C.I. Acid Blue 9 | | | 4 | | | | | | | | | 3 |
| TEGmBE | 10 | 10 | 10 | | | | 8 | 8 | 8 | | | |
| DEGmBE | | | | 12 | 12 | 12 | | | | | | |
| DPGmBE | | | | | | | | | | 10 | 10 | 10 |
| TEG | | | | 10 | 10 | 10 | | | | 10 | 10 | 10 |
| DEG | 10 | 10 | 10 | | | | 10 | 10 | 10 | | | |
| GL | 10 | 10 | 10 | 10 | 10 | 10 | 12 | 12 | 12 | 10 | 10 | 10 |
| Olfin E1010 | 1.0 | 1.0 | 1.0 | | | | 1.0 | 1.0 | 1.0 | | | |
| Olfin STG | | | | 0.8 | 0.8 | 0.8 | | | | 0.8 | 0.8 | 0.8 |
| TEA | 1.0 | 1.0 | 1.0 | 0.5 | 0.5 | 0.5 | 1.0 | 1.0 | 1.0 | 0.5 | 0.5 | 0.5 |
| EDTA | 0.01 | 0.01 | 0.01 | 0.01 | 0.01 | 0.01 | 0.01 | 0.01 | 0.01 | 0.01 | 0.01 | 0.01 |
| Proxel XL-2 | 0.3 | 0.3 | 0.3 | 0.3 | 0.3 | 0.3 | 0.3 | 0.3 | 0.3 | 0.3 | 0.3 | 0.3 |

Abbreviations in Tables 3 and 4 are:
TEGmBE: triethylene glycol monobutyl ether
DEGmBE: diethylene glycol monobutyl ether
DPGmBE: dipropylene glycol monobutyl ether
TEG: triethylene glycol
DEG: diethylene glycol
GL: glycerol
TEA: triethanolamine
EDTA: sodium ethylenediaminetetraacetate; chelating agent
Olfin E1010 and Olfin STG are trade names of acetylene glycol-based surfactants from Nisshin Chemical
Proxel XL-2 is a trade name of a preservative from Avecia K.K.

A printing test was performed using the inks obtained in the above Examples 7 to 12 and Comparative Examples 5 to 8 and using an EM-930C ink jet printer (made by Seiko-Epson). Four different types of recording medium were printed: PM mat paper (special ink jet printer paper), photoprint paper 2, PM photographic paper (made by Seiko-Epson), and Xerox 4024 ordinary paper (made by Xerox Co.), and the samples thus obtained were evaluated in the following tests 1 to 5.

Test 1: Light Fastness

For the various ink sets of the examples and comparative examples, the ink chambers of the EM-930C ink cartridge (made by Seiko-Epson) were filled with magenta, yellow, and cyan ink, and solid printing was performed in magenta, yellow, cyan, red, blue, green, and composite black. The printing method was adjusted so that the red consisted of magenta and yellow ink, the blue consisted of magenta and cyan ink, the green consisted of yellow and cyan ink, and the composite black consisted of magenta, yellow, and cyan ink. These printed samples were irradiated with light for 50 hours using a xenon weatherometer Ci5000 (made by Atlas Electric Devices), the hue (L*, a*, b*) before and after optical irradiation was measured with a Gretag densitometer (made by Gretag), the color difference ΔE*ab was found from the following equation (i), and an evaluation was made on the basis of the following criteria.

$$\Delta E^*ab = [(\Delta L^*)^2 + (\Delta a^*)^2 + (\Delta b^*)_2]^{1/2} \quad (i)$$

Evaluation Criteria

A: color difference ΔE*ab of 5 or less

B: color difference ΔE*ab of greater than 5, but not over 10

C: color difference ΔE*ab of greater than 10, but not over 20

D: color difference ΔE*ab of greater than 20

Test 2: Bleeding

Each of the ink sets from the examples and comparative examples was solid-printed in various colors on various recording media, and an evaluation was made according to the following criteria as to whether a color bled at the boundary with another color, or the mixing was not uniform.

Evaluation Criteria

A: no bleeding whatsoever

B: there were portions where a color bled or the mixing was not uniform, but they posed no practical problem C: there were noticeable portions where a color bled or the mixing was not uniform, to the extent of posing a practical problem Test 3: Nozzle Clogging Recoverability A head was repeatedly cleaned and filled with each of the inks from the various ink sets, each nozzle was checked to see if the ink was being discharged, and the nozzles were left uncapped for one month at 40° C. The power was then turned on to the printer, and an evaluation was made on the basis of the following criteria from the number of cleanings required for all nozzles to be capable of discharge.

Evaluation Criteria

A: one cleaning

B: two to four cleanings

C: five or more cleanings

D: no discharge

Test 4: Dryability

Using each of the ink sets, single-color solid printing and solid printing using a combination of two colors were performed for each of the ink compositions. After a specific time had elapsed since printing, the recording paper that had been printed was-pressed together with the same type of paper, and the papers were checked for ink transfer therebetween. An evaluation was made from these results on the basis of the following criteria.

Evaluation Criteria

A: no ink transfer observed even less than one second after printing

B: no ink transfer observed between at least two seconds and less than five seconds after printing C: ink transfer observed even after five seconds had elapsed since printing Test 5: Discharge Stability (Prolonged Continuous Recording)

Using each of the inks, continuous printing was performed for 48 hours at temperatures of 5° C., 20° C., and 40° C. The time was measured until missing dots or ink scattering was observed a total of ten times. An evaluation was made from these results on the basis of the following criteria.

Evaluation Criteria

A: no missing dots at any temperature; stable printing was possible

B: missing dots occurred as time passed at all temperatures

C: missing dots occurred from the start at all temperatures

The results of the above tests are given in Table 5.

TABLE 5

|  | Ex. 7 | Ex. 8 | Ex. 9 | Ex. 10 | Ex. 11 | Ex. 12 | C.E. 5 | C.E. 6 | C.E. 7 | C.E. 8 |
|---|---|---|---|---|---|---|---|---|---|---|
| Test 1 |  |  |  |  |  |  |  |  |  |  |
| Xerox 4024 | B | B | B | B | B | B | D | D | D | C |
| PM mat paper | A | A | A | A | A | A | C | C | C | B |
| photoprint paper | A | A | A | A | A | A | D | D | D | B |
| PM photographic paper | A | A | A | A | A | A | D | D | D | B |
| Test 2 |  |  |  |  |  |  |  |  |  |  |
| Xerox 4024 | B | B | B | B | B | B | C | C | C | C |
| PM mat paper | A | A | A | A | A | A | B | B | B | B |
| photoprint paper | A | A | A | A | A | A | B | B | B | B |
| PM photographic paper | A | A | A | A | A | A | B | B | B | B |
| Test 3 | A | B | B | B | A | B | B | B | B | B |
| Test 4 | A | A | A | A | A | A | A | A | A | A |
| Test 5 | A | A | A | A | A | A | A | A | A | A |

INDUSTRIAL APPLICABILITY

As described above, the present invention provides an ink that has excellent light fastness in an ink jet recording system, and also has good water resistance, moisture resistance, and color, and provides an ink and an ink jet recording method with which storage stability, nozzle clogging resistance, and other such reliability factors are good.

The present invention further provides an ink set and an ink jet recording method that provide excellent light fastness in an ink jet recording system, as well as good color reproducibility, clogging resistance, and other such characteristics.

What is claimed is:

1. A magenta ink, comprising at least water, a water-soluble organic solvent, a first dye, and a second dye, the first dye having a structure expressed by the following General Formula I, the second dye being one or more types of dye selected from the group consisting of C.I. Acid Violet 9 and 30 and C.I. Acid red 50, and 289, and the weight ratio of first dye to second dye being 5:1 to 1:5.

General Formula I:

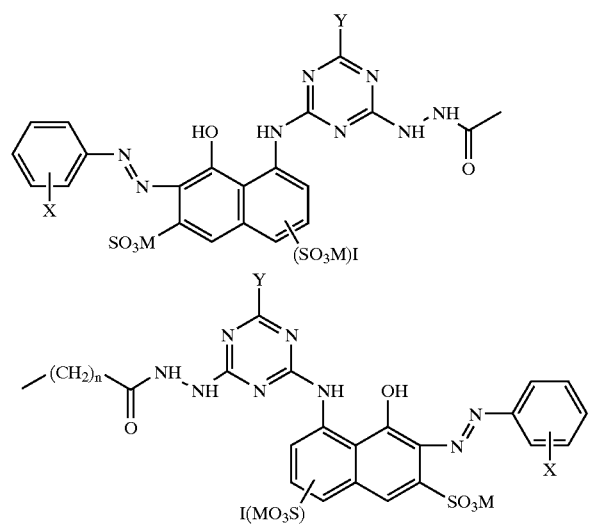

X: —COOM or SO$_3$M
Y: —H, —NH$_2$, —O(CH$_2$)mH$_1$
M: —H, —Li, —Na, —K, —NH$_4$, —NH(CH$_2$OH)
n = 2 to 10
m = 1 to 4
i = 0 or 1

General Formula II:

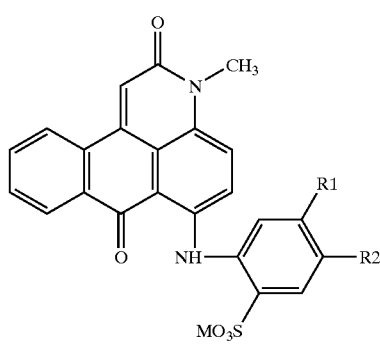

where M is H, Li, Na, K, ammonium, or an organic amine;
R1 is H, Cl, or

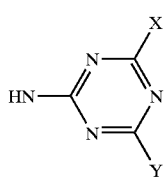

where X is an anilino group substituted with at least one SO$_3$M;
Y is OH, Cl, or a morpholino group
R2 is H, CH$_3$, Cl, or SO$_3$M.

2. The ink according to claim 1, wherein the first and second dyes are water-soluble dyes.

3. The ink according to claim 1, wherein the total amount of dye contained in the ink is 0.5 to 5 wt % of the total ink weight.

4. The ink according to claim 1, containing glycol ether of a lower alkyl and/or an acetylene glycol-based nonionic surfactant.

5. The ink according to claim 4, wherein the glycol ether of a lower alkyl includes at least one compound selected from the group consisting of diethylene glycol monobutyl ether, triethylene glycol monobutyl ether, propylene glycol monobutyl ether, and dipropylene glycol monobutyl ether.

6. The ink according to claim 4, wherein the glycol ether of a lower alkyl is contained in an amount of 3 to 30 wt % of the total ink weight.

7. The ink according to claim 4, wherein the acetylene glycol-based nonionic surfactant is contained in an amount of 0.1 to 3 wt % of the total ink weight.

8. An ink set comprising at least a dye, a water-soluble organic solvent, and water,
wherein said ink set comprises:
the magenta ink according to claim 1;
a yellow ink comprising a dye containing C.I. Direct Yellow 86 and C.I. Direct Yellow 132 in a weight ratio of from 1:3 to 3:1, or a dye containing C.I. Direct Yellow 86 and C.I. Direct Yellow 173 in a weight ratio of from 1:4 to 4:1; and
a cyan ink containing C.I. Direct Blue 86 and/or C.I. Direct Blue 199.

9. The ink set according to claim 8, wherein the respective dyes of the magenta ink, yellow ink, and cyan ink are water-soluble dyes.

10. The ink set according to claim 8, wherein the total amount of dye contained in the magenta ink is 1 to 4 wt % of the total ink weight, the total amount of dye contained in the yellow ink is 0.5 to 4 wt % of the total ink weight, and the total amount of dye contained in the cyan ink is 1 to 4 wt % of the total ink weight.

11. The ink set according to claim 8, containing a glycol ether of a lower alkyl and/or an acetylene glycol-based nonionic surfactant.

12. The ink set according to claim 11, wherein the glycol ether of a lower alkyl includes at least one compound selected from the group consisting of diethylene glycol monobutyl ether, triethylene glycol monobutyl ether, propylene glycol monobutyl ether, and dipropylene glycol monobutyl ether.

13. The ink set according to claim 11, wherein the glycol ether of a lower alkyl is contained in an amount of 3 to 30 wt % of the total ink weight.

14. The ink set according to claim 11, wherein the acetylene glycol-based nonionic surfactant is contained in an amount of 0.1 to 3 wt % of the total ink weight.

15. An ink jet recording method comprising discharging droplets of ink and causing them to adhere to a recording medium,
wherein the ink comprises the magenta ink according to claim 1.

16. An ink jet recording method comprising forming a color image with a plurality of inks comprising at least a magenta ink, a yellow ink, and a cyan ink,
wherein the plurality of inks comprises the ink set according to claim 8.

17. A recorded product, recorded using the magenta ink according to claim 1.

18. A recorded product, recorded by the recording method according to claim 16.

19. The magenta ink of claim 1, wherein the second dye comprises C.I. Acid Violet 9.

20. The magenta ink of claim 1, wherein the second dye comprises C.I. Violet 30.

21. The magenta ink of claim 1, wherein the second dye comprises C.I. Acid Red 50.

22. The magenta ink of claim 1, wherein the second dye comprises C.I. Acid Red 289.

23. The magenta ink of claim 1, wherein the second dye comprises C.I. Acid Red 289 and C.I. Acid Violet 30.

* * * * *